(12) United States Patent
Penzias (10) Patent No.: US 8,137,195 B2
(45) Date of Patent: Mar. 20, 2012

(54) SEMANTIC GAMING AND APPLICATION TRANSFORMATION

(75) Inventor: Arno Penzias, San Francisco, CA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 771 days.

(21) Appl. No.: 11/286,702

(22) Filed: Nov. 23, 2005

(65) Prior Publication Data

US 2006/0178212 A1 Aug. 10, 2006

Related U.S. Application Data

(60) Provisional application No. 60/630,408, filed on Nov. 23, 2004.

(51) Int. Cl.
*A63F 13/00* (2006.01)

(52) U.S. Cl. .......................................................... 463/37

(58) Field of Classification Search .................... 463/36, 463/37, 38
See application file for complete search history.

(56) References Cited

U.S. PATENT DOCUMENTS

| | | | |
|---|---|---|---|
| 4,787,051 A | 11/1988 | Olson | |
| 4,839,838 A | 6/1989 | LaBiche et al. | |
| 5,045,843 A | 9/1991 | Hansen | |
| 5,128,671 A | 7/1992 | Thomas, Jr. | |
| 5,138,154 A | 8/1992 | Hotelling | |
| 5,181,181 A | 1/1993 | Glynn | |
| 5,359,348 A | 10/1994 | Pilcher et al. | |
| 5,396,265 A | 3/1995 | Ulrich et al. | |
| 5,440,326 A | 8/1995 | Quinn | |
| 5,453,758 A | 9/1995 | Sato | |
| 5,484,355 A * | 1/1996 | King et al. | 482/4 |
| 5,506,605 A | 4/1996 | Paley | |
| 5,698,784 A | 12/1997 | Hotelling et al. | |
| 5,703,623 A | 12/1997 | Hall et al. | |
| 5,741,182 A * | 4/1998 | Lipps et al. | 463/36 |
| 5,757,360 A * | 5/1998 | Nitta et al. | 345/156 |
| 5,796,354 A * | 8/1998 | Cartabiano et al. | 341/22 |
| 5,825,350 A | 10/1998 | Case, Jr. et al. | |
| 5,835,156 A | 11/1998 | Blonstein et al. | |
| 5,898,421 A | 4/1999 | Quinn | |
| 5,912,612 A | 6/1999 | DeVolpi | |
| 5,955,988 A | 9/1999 | Blonstein et al. | |
| 6,002,394 A | 12/1999 | Schein et al. | |
| 6,016,144 A | 1/2000 | Blonstein et al. | |
| 6,049,823 A | 4/2000 | Hwang | |
| 6,069,594 A | 5/2000 | Barnes et al. | |

(Continued)

OTHER PUBLICATIONS

International Search Report for PCT/US05/15096, mailed May 15, 2006.
Written Opinion for PCT/US05/15096, mailed May 15, 2006.
International Search Report for PCT/US04/35369, mailed May 11, 2006.
Written Opinion for PCT/US04/35369, mailed May 11, 2006.
Geen, J., et al., "New iMEMS Angular-Rate-Sensing Gyroscope," Analog Dialogue, 37-03 (2003), pp. 1-4.
Navarrete, P., et al., "Eigenspace-based Recognition of Faces: Comparisons and a new Approach," Image Analysis and Processing, 2001, pp. 1-6.

(Continued)

*Primary Examiner* — Dmitry Suhol
*Assistant Examiner* — Malina K Rustemeyer
(74) *Attorney, Agent, or Firm* — Potomac Patent Group PLLC (57) ABSTRACT

A gaming system comprises a handheld user input device, a processor for receiving input data from the handheld user input device and a gaming application for receiving data from the processor based on the received input data from the handheld user input device. The handheld user input device emulates one of a plurality of different devices associated with the gaming application. Each of the plurality of different devices have a set of input commands associated therewith. The set of input commands associated with the one of a plurality of different devices includes a command based on one of motion and orientation of the handheld device.

30 Claims, 7 Drawing Sheets

U.S. PATENT DOCUMENTS

| | | | |
|---|---|---|---|
| 6,115,028 | A | 9/2000 | Balakrishnan et al. |
| 6,164,808 | A | 12/2000 | Shibata et al. |
| 6,191,774 | B1 | 2/2001 | Schena et al. |
| 6,400,996 | B1 | 6/2002 | Hoffberg et al. |
| 6,466,198 | B1 | 10/2002 | Feinstein |
| 6,466,831 | B1 | 10/2002 | Shibata et al. |
| 6,473,713 | B1 | 10/2002 | McCall et al. |
| 6,492,981 | B1 | 12/2002 | Stork et al. |
| 6,544,126 | B2* | 4/2003 | Sawano et al. .................. 463/42 |
| 6,650,313 | B2 | 11/2003 | Levine et al. |
| 6,672,962 | B1* | 1/2004 | Ozaki et al. ..................... 463/37 |
| 6,753,849 | B1 | 6/2004 | Curran et al. |
| 6,757,446 | B1 | 6/2004 | Li et al. |
| 6,929,548 | B2 | 8/2005 | Wang |
| 6,933,923 | B2 | 8/2005 | Feinstein |
| 6,984,208 | B2 | 1/2006 | Zheng |
| 6,990,639 | B2 | 1/2006 | Wilson |
| 6,998,966 | B2 | 2/2006 | Pedersen et al. |
| 7,098,891 | B1* | 8/2006 | Pryor ........................... 345/158 |
| 7,158,118 | B2 | 1/2007 | Liberty |
| 7,173,604 | B2 | 2/2007 | Marvit et al. |
| 7,262,760 | B2 | 8/2007 | Liberty |
| 2002/0158843 | A1 | 10/2002 | Levine et al. |
| 2003/0107551 | A1 | 6/2003 | Dunker |
| 2003/0193572 | A1 | 10/2003 | Wilson et al. |
| 2004/0095317 | A1 | 5/2004 | Zhang et al. |
| 2004/0193413 | A1 | 9/2004 | Wilson et al. |
| 2004/0204240 | A1* | 10/2004 | Barney ........................... 463/36 |
| 2004/0229693 | A1* | 11/2004 | Lind et al. ....................... 463/37 |
| 2004/0239626 | A1 | 12/2004 | Noguera |
| 2004/0268393 | A1 | 12/2004 | Hunleth et al. |
| 2005/0125826 | A1 | 6/2005 | Hunleth et al. |
| 2005/0174324 | A1 | 8/2005 | Liberty et al. |
| 2005/0212767 | A1 | 9/2005 | Marvit et al. |
| 2005/0243061 | A1 | 11/2005 | Liberty et al. |
| 2005/0253806 | A1 | 11/2005 | Liberty et al. |
| 2006/0028446 | A1 | 2/2006 | Liberty et al. |
| 2006/0092133 | A1 | 5/2006 | Touma et al. |

OTHER PUBLICATIONS

Jakubowski, J., et al., "Higher Order Statistics and Neural Network for Tremor Recognition," IEEE Transactions on Biomedical Engineering, vol. 49, No. 2, Feb. 2002, pp. 152-159.

Liu, C., et al., "Enhanced Fisher Linear Discriminant Models for Face Recognition," Proc. 14th International Conference on Pattern Recognition, Queensland, Australia, Aug. 17-20, 1998, pp. 1-5.

Supplemental European Search Report for Application No. EP 05 74 4089 mailed Mar. 6, 2008.

W. T. Ang, et al., "Design and Implementation of Active Error Canceling in Hand-held Microsurgical Instrument," Proceedings of the 2001 IEEE/RSJ International Conference on Intelligent Robots and Systems, vol. 2, Oct. 2001, pp. 1106-1111.

W. T. Ang, et al., "Design of All-Accelerometer Inertial Measurement Unit for Tremor Sensing in Hand-held Microsurgical Instrument," Proceedings of the 2003 IEEE International Conference on Robotics & Automation, Sep. 2003, pp. 1781-1786.

J. Jakubowski, et al., "Increasing Effectiveness of Human Hand Tremor Separation Process by Using Higher-Order Statistics," Measurement Science Review, vol. 1, No. 1, 2001, pp. 43-46.

J. Jakubowski, et al., "Higher Order Statistics and Neural Network for Tremor Recognition," IEEE Transactions on Biomedical Engineering, vol. 49, No. 2, Feb. 2002, pp. 152-159.

J. Raethjen, et al., "Tremor Analysis in Two Normal Cohorts," Clinical Neurophysiology 115, 2004, pp. 2151-2156.

C. N. Riviere, et al., "Adaptive Canceling of Physiological Tremor for Improved Precision in Microsurgery," IEEE Transactions on Biomedical Engineering, vol. 45, No. 7, Jul. 1998, pp. 839-846.

C. N. Riviere, et al., "Toward Active Tremor Canceling in Handheld Microsurgical Instruments," IEEE Transactions on Robotics and Automation, vol. 19, No. 5, Oct. 2003, pp. 793-800.

J. Timmer, et al., "Characteristics of Hand Tremor Time Series," Biological Cybernetics, vol. 70, 1993, pp. 75-80.

J. Timmer, et al., "Cross-Spectral Analysis of Physiological Tremor and Muscle Activity: I Theory and application to Unsynchronized Electromyogram," Biological Cybernetics, vol. 78, 1998, pp. 349-357.

J. Timmer, et al., "Cross-Spectral Analysis of Physiological Tremor and Muscle Activity: II Application to Synchronized Electromyogram," Biological Cybernetics, vol. 78, 1998, pp. 359-368.

J. Timmer, "Modeling Noisy Time Series: Physiological Tremor," International Journal of Bifurcation and Chaos, vol. 8, No. 7, 1998, pp. 1505-1516.

J. Timmer, et al., "Cross-Spectral Analysis of Tremor Time Series," International Journal of Bifurcation and Chaos, vol. 10, No. 11, 2000, pp. 2595-2610.

J. Timmer, et al., "Pathological Tremors: Deterministic Chaos or Nonlinear Stochastic Oscillators?" Chaos, vol. 10, No. 1, Mar. 2000, pp. 278-288.

V. Digalakis, et al., "ML Estimation of a Stochastic Linear System with the EM Algorithm and Its Application to Speech Recognition," IEEE Transactions on Speech and Audio Processing, vol. 1, No. 4, Oct. 1993, pp. 431-442.

S. Haykin, et al., "Adaptive Tracking of Linear Time-Variant Systems by Extended RLS Algorithms," IEEE Transactions on Signal Processing, vol. 45, No. 5, May 1997, pp. 1118-1128.

B. F. La Scala, et al., "Design of an Extended Kalman Filter Frequency Tracker," IEEE Transactions on Signal Processing, vol. 44, No. 3, Mar. 1996, pp. 739-742.

K. Nishiyama, "Robust Estimation of a Single Complex Sinusoid in White Noise—$H\infty$ Filtering Approach," IEEE Transactions on Signal Processing, vol. 47, No. 10, Oct. 1999, pp. 2853-2856.

K. Nishiyama, "A Nonlinear Filter for Estimating a Sinusoidal Signal and its Parameters in White Noise: On the Case of a Single Sinusoid," IEEE Transactions on Signal Processing, vol. 45, No. 4, Apr. 1997, pp. 970-981.

B. Widrow, et al., "Fundamental Relations Between the LMS Algorithm and the DFT," IEEE Transactions on Circuits and Systems, vol. 34, No. CAS-7, Jul. 1987, pp. 814-820.

A. H. Sayed, "A Framework for State-Space Estimation with Uncertain Models," IEEE Transactions on Automatic Control, vol. 46, No. 7, Jul. 2001, pp. 998-1013.

Website: J. Timmer, "Data Analysis and Modeling of Dynamic Processes in the Life Sciences," Freiburg Center for Data Analysis and Modeling, http://webber.physik.uni-freiburg.de/~jeti/, retrieved Aug. 17, 2007, pp. 1-2.

Website: "Freiburg Center for Data Analysis and Modeling—Publications," http://www.fdm.uni-freiburg.de/cms/puplications/publications/, retrieved Aug. 17, 2007, pp. 1-11.

Website: C. Riviere, Robotics Institute, http://www.ri.cmu.edu/people/riviere_cameron.html, retrieved Aug. 17, 2007, pp. 1-4.

Website: A Beuter, Publications, University of Quebec at Montreal, http://www.er.uqam.ca/nobel/r11040/publicat.htm, retrieved Aug. 17, 2007, pp. 1-7.

Website: R. Murray-Smith, Hamilton Institute, http://www.dcs.gla.ac.uk/~rod/, retrieved Aug. 17, 2007, pp. 1-5.

Website: Z. Jian, et al., "Adaptive Noise Cancellation," Rice University, http://www.ece.rice.edu/~klwang/elec434/elec434.htm, retrieved Aug. 17, 2007, pp. 1-6.

Website: A. H. Sayed, "UCLA Adaptive Systems Laboratory-Home Page," UCLA, http://asl.ee.ucla.edu/index.php?option=com_frontpage&Itemid=1, retrieved Aug. 17, 2007, p. 1.

International Search Report for PCT/US05/15051 mailed Feb. 19, 2008.

Written Opinion for PCT/US05/15051 mailed Feb. 19, 2008.

Office Action for Chinese Application No. 200580021163.7 mailed Jan. 25, 2008.

International Search Report for PCT/US05/42558 mailed Nov. 30, 2006.

Written Opinion for PCT/US05/42558 mailed Nov. 30, 2006.

* cited by examiner

SEMANTIC GAMING AND APPLICATION TRANSFORMATION

RELATED APPLICATIONS

This application claims the benefit of U.S. Provisional Patent Application No. 60/630,408 filed on Nov. 23, 2004 and entitled "Semantic Gaming And Application Transformation", the content of which is incorporated here by reference.

This application is also related to, and claims priority from, U.S. patent application Ser. Nos. 11/119,663 filed on May 2, 2005 entitled "Freespace Pointing Devices and Methods" and Ser. No. 10/768,432, filed on Jan. 30, 2004 entitled "A Control Framework with a Zoomable Graphical User Interface for Organizing, Selecting and Launching Media Items". The subject matter of each of these applications is incorporated in its entirety herein by reference.

BACKGROUND

The present invention relates, generally, to user interfaces and methods associated therewith and, more specifically, to user interfaces and methods involving semantically coupling the actions of handheld devices into application inputs.

User interfaces are ubiquitous in today's society. Computers, cell phones, fax machines and televisions, to name a few products, all employ user interfaces. User interfaces are intended to provide a mechanism for users to easily access and manipulate the, sometimes complex, functionality of the devices that they support. An example of a user interface is found in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference. Typically, such user interfaces employ remote, handheld devices to provide inputs to their respective applications.

Most interface designs for gaming applications include special purpose remote input devices with limited range of motion sensitivity. The result is that morphing devices for different purposes within one gaming application, or across different games, is difficult and restrictive. So-called virtual reality systems provide more flexibility, e.g. by requiring a user to "suit up", but are physically burdensome and expensive. Accordingly, it would be desirable to provide new user interfaces and handheld devices which overcome the drawbacks associated with existing gaming (and other) applications.

SUMMARY OF THE INVENTION

In one embodiment, a gaming system comprises a handheld user input device, a processor for receiving input data from the handheld user input device and a gaming application for receiving data from the processor based on the received input data from the handheld user input device. The handheld user input device emulates one of a plurality of different devices associated with the gaming application. Each of the plurality of different devices have a set of input commands associated therewith. The set of input commands associated with the one of a plurality of different devices includes a command based on one of motion and orientation of the handheld device.

In another embodiment, a method for using a handheld user input device comprises: executing an application program on a processor, establishing a communication data link between the handheld user input device and the processor, receiving user input data by the processor via the handheld user input device, receiving data by the application program from the processor based on the received user input data, and reflecting user input on a display wherein the user input corresponds to one of motion and orientation of the handheld user input device.

In a further embodiment, a system comprises: a handheld user input device, a processor for receiving input data from the handheld user input device, and a software application executing on the processor and receiving data from the processor based on input data received from the handheld user input device. The handheld user input device emulates one of a plurality of different devices associated with the application. Each of the plurality of different devices have a set of input commands associated therewith wherein the commands include a command based on one of motion and orientation of the handheld device.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Exemplary embodiments of the present invention provide a generic user input device that tracks user movement in freespace. Both gestures and actions can be measured, recorded and responded to by the associated application(s). The result is a low-cost and flexible gaming device that can, via the appropriate application software, become all manner of units. For example, any number of weapon types like swords, guns, grenade launchers and so on can be modeled with one common handheld device. Exemplary embodiments of the present invention are also much cheaper to implement than full immersion virtual reality systems with and without haptic feedback.

Figure 1:
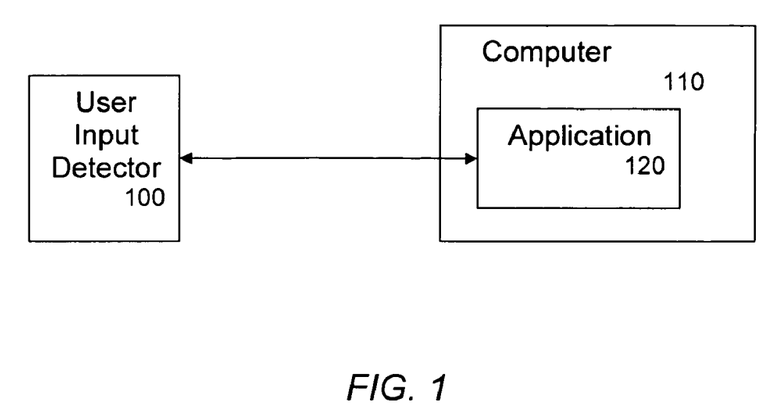
FIG. 1 depicts an exemplary system according to an exemplary embodiment of the present invention.

A high level view of an exemplary embodiment of the present invention is provided in FIG. 1. Therein, a handheld device (or, user input detector) 100 provides input to computer 110 which is running an application 120 such as a gaming application for example. According to one exemplary embodiment of the present invention, the handheld device 100 is a free-space device capable of sensing movement in at least 2 degrees of freedom and preferably 6 degrees of freedom. An example of a free-space pointing device is found in U.S. Provisional Patent Application 60/612,571, filed on Sep. 23, 2004, entitled "Free Space Pointing Devices and Methods" (corresponding to U.S. application Ser. No. 11/119,663 cited above), the disclosure of which is incorporated here by reference. Also, in the same exemplary embodiment, the computer 110 could be a gaming console or PC or set-top box, among others and the application 120 may be a game.

The application 120 can be a gaming application using an user interface such as that described in U.S. Patent Application Publication No. US 2005/0125826, which corresponds to U.S. patent application Ser. No. 11/029,329 filed on Jan. 5, 2005, which is a continuation of U.S. patent application Ser. No. 10/768,432 filed on Jan. 30, 2004, that is also incorporated here by reference.

In order to provide some context for this description, an exemplary aggregated media system 200 in which the present invention can be implemented will first be described with respect to FIG. 2. Those skilled in the art will appreciate, however, that this invention is not restricted to implementation in this type of media system and that more or fewer components can be included therein.

The media system 200 may include an input/output (I/O) bus 210 that connects the components in the media system together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or IR or radio frequency (RF) transceivers that route control signals, optical fiber or any other routing mechanisms that route other types of signals.

In this exemplary embodiment, the media system 200 includes a television/monitor 212, a gaming console or gaming device 214, digital video disk (DVD) recorder/playback device 216, audio/video tuner 218, and compact disk (CD) player 220 coupled to the I/O bus 210. The DVD 216 and CD player 220 may be single disk or single cassette devices, or alternatively may be multiple disk or multiple cassette devices. They may be independent units or integrated together. In addition, the media system 200 includes a microphone/speaker system 222, video camera 224, and a wireless I/O control device 226.

The wireless I/O control device 226 may be a media system remote control unit that supports free-space pointing, has a minimal number of buttons to support navigation, and communicates with the entertainment system 200 through RF signals. For example, wireless I/O control device 226 can be a free-space pointing device that uses a gyroscope or other mechanism to define both a screen position and a motion vector to determine the particular command desired. A set of buttons can also be included on the wireless I/O device 226 to initiate a "click" primitive as well as a "back" button. In another exemplary embodiment, wireless I/O control device 226 is a media system remote control unit, which communicates with the components of the entertainment system 200 through IR signals. In yet another embodiment, wireless I/O control device 226 may be an IR remote control device similar in appearance to a typical entertainment system remote control with the added feature of a track-ball or other navigational mechanisms, which allows a user to position a cursor on a display.

The system 200 also includes a system controller 228, which may operate to store and display entertainment system data available from a plurality of entertainment system data sources and to control a wide variety of features associated with each of the system components. As depicted in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a GUI described below.

Figure 2:
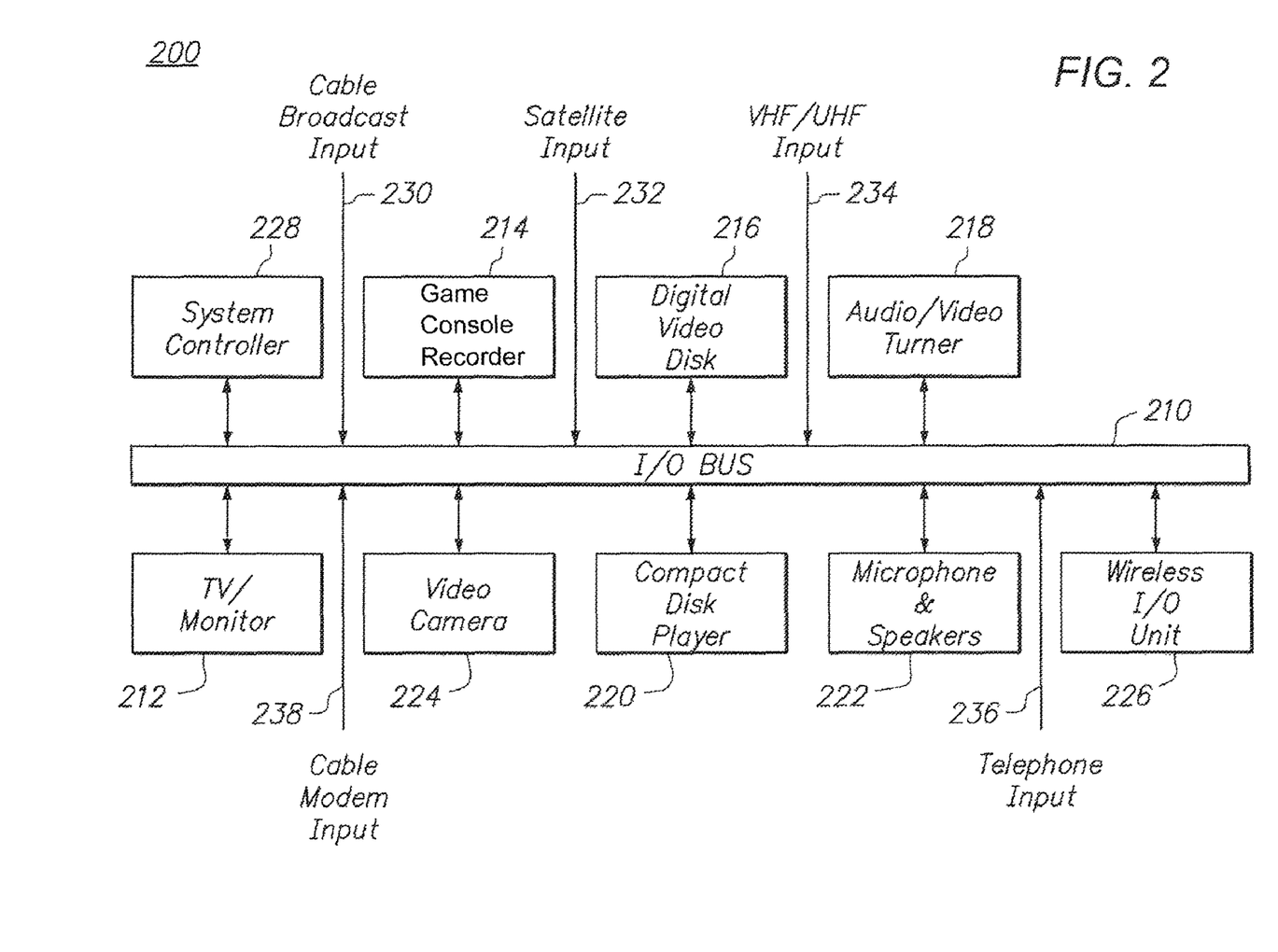
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236, and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

Figure 3:
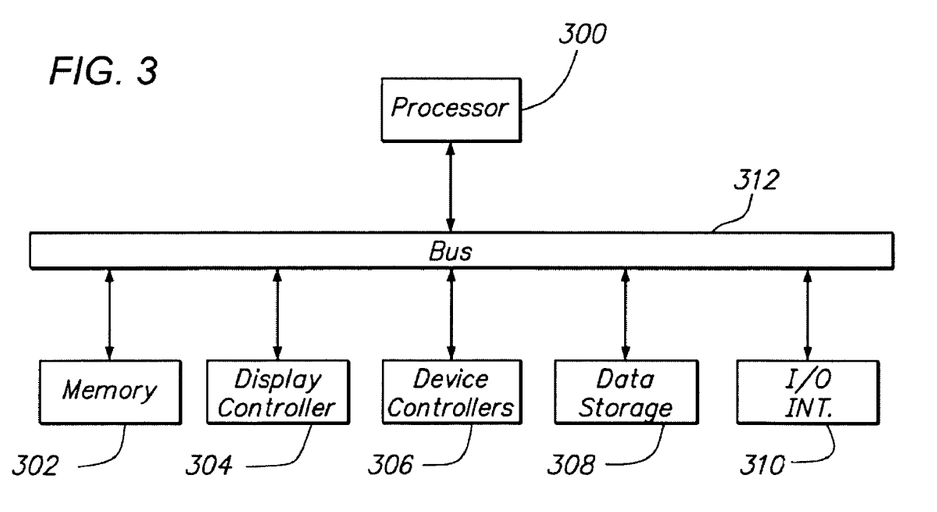
FIG. 3 depicts a system controller of FIG. 2 in more detail.

FIG. 3 is a block diagram illustrating an embodiment of an exemplary system controller 228, which can, for example, be implemented as a set-top box and include, for example, a processor 300, memory 302, a display controller 304, other device controllers 306 (e.g., associated with the other components of system 200), one or more data storage devices 308, and an I/O interface 310. These components communicate with the processor 300 via bus 312. Those skilled in the art will appreciate that processor 300 can be implemented using one or more processing units.

Memory device(s) 302 may include, for example, DRAM or SRAM, ROM, some of which may be designated as cache memory, which store software to be run by processor 300 and/or data usable by such programs, including software and/or data associated with the GUIs described below. Display controller 304 is operable by processor 300 to control the display of monitor 212 to, among other things, display GUI screens and objects as described below. Zoomable GUIs provide resolution independent zooming, so that monitor 212 can provide displays at any resolution. Device controllers 306 provide an interface between the other components of the media system 200 and the processor 300. Data storage 308 may include one or more of a hard disk drive, a floppy disk drive, a CD-ROM device, or other mass storage device. Input/output interface 310 may include one or more of a plurality of interfaces including, for example, a keyboard interface, an RF interface, an IR interface and a microphone/speech interface. I/O interface 310 may include an interface for receiving location information associated with movement of a wireless pointing device.

Generation and control of a GUI to display media item selection information is performed by the system controller 228 in response to the processor 300 executing sequences of instructions contained in the memory 302. Such instructions may be read into the memory 302 from other computer-readable media such as data storage device(s) 308 or from a computer connected externally to the media system 200. Execution of the sequences of instructions contained in the memory 302 causes the processor to generate GUI objects and controls, among other things, on monitor 212.

In alternative embodiments, hard-wired circuitry may be used in place of or in combination with software instructions. It will be understood that control frameworks described herein overcome limitations of conventional interface frameworks, for example those associated with the television industry. The terms "GUI", "GUI screen", "display" and "display screen" are intended to be generic and refer to television displays, computer displays, and any other display device.

As described in the above-incorporated Provisional Patent Application No. 60/612,571, various different types of remote devices can be used as the input device 100, 226, including, for example, trackballs, "mouse"-type pointing devices, light pens, etc., as well as free-space pointing devices. The phrase "free-space pointing" refers to the ability of an input device to move in three (or more) dimensions in the air in front of a display screen, for example, and the corresponding ability of the user interface to translate those motions directly into user interface commands, e.g., movement of a cursor on the display screen.

Data can be transferred between the free-space pointing device and the computer or other device either wirelessly or via a wire connecting the free-space pointing device to the other device. Thus "free-space pointing" differs from conventional computer mouse pointing techniques, for example, which use a surface, e.g., a desk surface or mouse pad, as a proxy surface from which relative movement of the mouse is translated into cursor movement on the computer display screen.

Figures 4, 5:
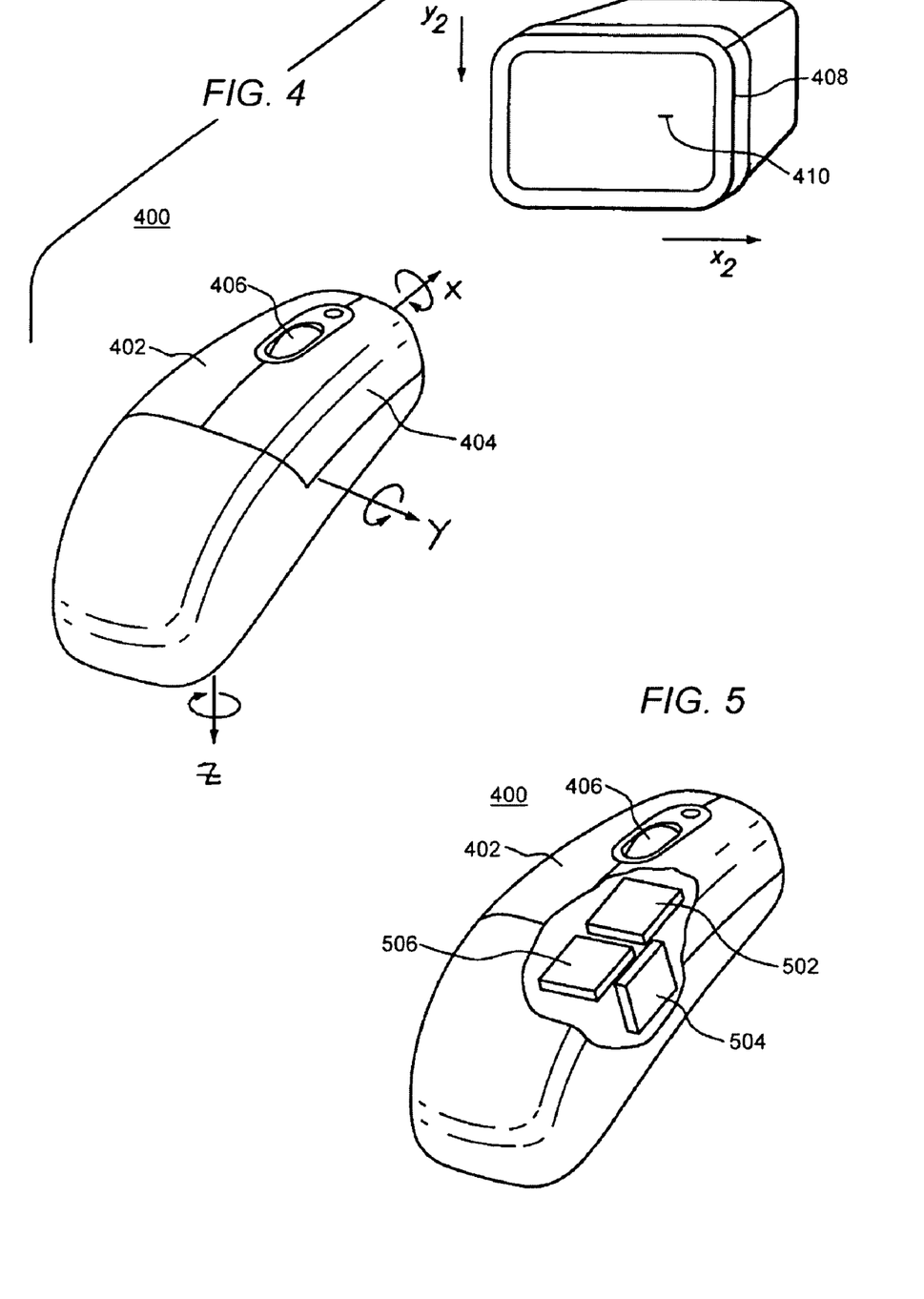
FIG. 4 depicts a free-space pointing device.
FIG. 5 depicts sensors in a free-space pointing device.

An exemplary free-space pointing device 400 (corresponding to user input detector 100 of FIG. 1 for example) is depicted in FIG. 4. User movement of the free-space pointing device can be defined, for example, in terms of a combination of x-axis attitude (roll), y-axis elevation (pitch) and/or z-axis heading (yaw) motion of the device 400. Linear movement of the pointing device 400 along the x, y, and z axes may also be measured to generate cursor movement or other user interface commands. In the exemplary embodiment depicted in FIG. 4, the free-space pointing device 400 includes two buttons 402, 404 and a scroll wheel 406, although other embodiments can have other physical configurations.

The free-space pointing device 400 may be held by a user in front of a display 408, such as the monitor 212, and motion of the pointing device 400 is translated into output signals that are usable for interaction with information presented on the display 408, e.g., to move a cursor 410 on the display 408. It will be understood that the display 408 may be included in the computer 110 depicted in FIG. 1.

Rotation of the device 400 about the y-axis can be sensed by the device 400, for example, and translated into an output usable by the system to move cursor 410 along the $y_2$ axis of the display 408. Likewise, rotation of the device 400 about the z-axis can be sensed and translated into an output usable by the system to move cursor 410 along the $x_2$ axis of the display 408. It will be appreciated that the output of pointing device 400 can be used to interact with the display 408 in a number of ways other than (or in addition to) cursor movement.

For example, the device 400 can control cursor fading or control volume or media transport (play, pause, fast-forward, and rewind) in a system such as the media entertainment system 200. Input commands may also include, for example, a zoom in or zoom out on a particular region of a display. A cursor may or may not be visible. Similarly, rotation of the free-space pointing device 400 sensed about the x-axis of free space pointing device 400 can be used in addition to, or as an alternative to, y-axis and/or z-axis rotation to provide input to a user interface.

Referring to FIG. 5, rotational sensors 502, 504 and an accelerometer 506 can be employed as sensors in the device 400. The sensors 502, 504 can, for example, be ADXRS150 sensors made by Analog Devices, although it will be appreciated by those skilled in the art that other types of rotational sensors can be used and that ADXRS150 sensors are simply illustrative examples. If the rotational sensors 502, 504 have a single sensing axis (as an ADXRS150 sensor does, for example), then they may be mounted in the free-space pointing device 400 such that their sensing axes are aligned with the rotations to be measured, although this is not necessary. In the exemplary embodiment depicted in FIGS. 4 and 5, this means that rotational sensor 502 is mounted such that its sensing axis is parallel to the y-axis and that rotational sensor 504 is mounted such that its sensing axis is parallel to the z-axis as shown.

Measurements and calculations are performed by the device 400 that are used to adjust the outputs of one or more of the sensors 502, 504, 506 and/or as part of the input used by a processor to determine an appropriate output for the user interface based on the outputs of the sensors 502, 504, 506. These measurements and calculations are used to compensate for several factors, such as errors associated with the sensors 502, 504, 506 and the manner in which a user uses the free-space pointing device 400, e.g., linear acceleration, tilt and tremor.

Figure 6:
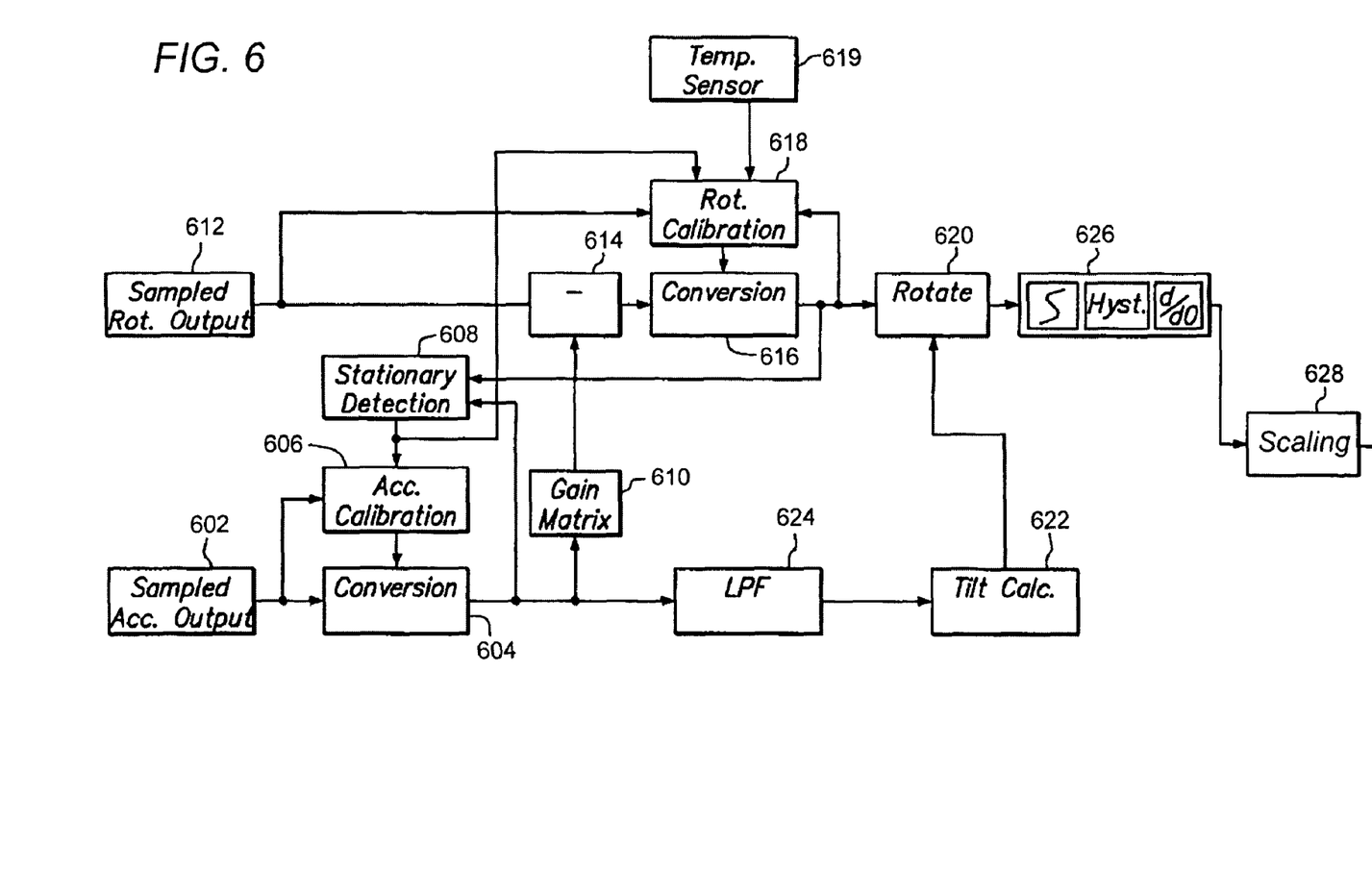
FIG. 6 depicts a process model that describes the general operation of a free-space pointing device.

A process model 600 that describes the general operation of a free-space pointing device 400 is illustrated in FIG. 6. The sensors 502, 504, 506 produce analog signals that are sampled periodically, such as 200 samples/second, for example. The sampled output from the accelerometer 506 is indicated at block 602, and the sampled output values are converted from raw units to units of acceleration, e.g., gravities (g), as indicated by conversion function 604. An acceleration calibration block 606 provides values used for the conversion function 604. This calibration of the accelerometer output 602 can include, for example, compensation for one or more of scale, offset, and axis misalignment error associated with the accelerometer 506.

The accelerometer 506 may be used to compensate for fluctuations in the readings generated by the rotational sensors 502, 504 that are caused by variances in linear acceleration by multiplying the converted accelerometer readings by a gain matrix 610 and subtracting (or adding) the results from (or to) the corresponding sampled rotational sensor data 612. Similarly, linear acceleration compensation for the sampled rotational data from sensor 504 can be provided at block 614.

Like the accelerometer data, the sampled rotational data 612 is then converted from a sampled unit value into a value associated with a rate of angular rotation, e.g., radians/s, at function 616. This conversion step can also include calibration provided by function 618 to compensate the sampled rotational data for factors such as scale and offset. To accomplish dynamic offset compensation, an input from a temperature sensor 619 may be used in rotation calibration function 618.

After conversion/calibration at block 616, the inputs from the rotational sensors 502, 504 can be further processed to rotate those inputs into an inertial frame of reference, i.e., to compensate for tilt associated with the manner in which the user is holding the free-space pointing device 400, at function 620.

Tilt correction to compensate for a user's holding the pointing device 400 at different x-axis rotational positions can be accomplished by determining the tilt of the device 400 using the inputs y and z received from accelerometer 506 at function 622. After the acceleration data is converted and calibrated as described above, it can be low-pass filtered at LPF 624 to provide an average acceleration value to the tilt determination function 622.

After compensation for linear acceleration, processing into readings indicative of angular rotation of the free-space pointing device 400, and compensation for tilt, post-processing can be performed at blocks 626 and 628 to compensate for factors such as human tremor. Although tremor may be removed using several different methods, one way to remove tremor is by using hysteresis. The angular velocity produced by rotation function 620 is integrated to produce an angular position. Hysteresis of a calibrated magnitude is then applied to the angular position. The derivative is taken of the output of the hysteresis block to again yield an angular velocity. The resulting output is then scaled at function 628 (e.g., based on the sampling period) and used to generate a result within the interface, e.g., movement of the cursor 410 on the display 408.

Figure 7:
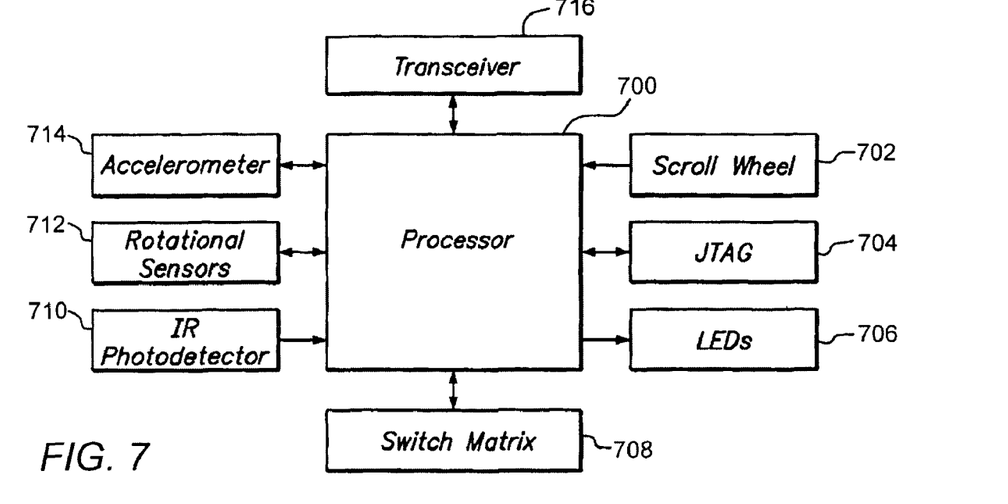
FIG. 7 illustrates an exemplary hardware architecture using a free-space pointing device.

FIG. 7 illustrates an exemplary hardware architecture, including a processor 700 that communicates with other elements of the free-space pointing device 400 including a scroll wheel 702, JTAG 704, LEDs 706, switch matrix 708, IR photodetector 710, rotational sensors 712, accelerometer 714 and transceiver 716. The scroll wheel 702 is an optional input component that enables a user to provide input to the interface by rotating the scroll wheel 702. JTAG 704 provides a programming and debugging interface to the processor. LEDs 706 provide visual feedback to a user, for example, when a button is pressed or a function activated. Switch matrix 708 receives inputs, e.g., indications that a button on the free-space pointing device 400 has been depressed or released, that are then passed on to processor 700. The optional IR photodetector 710 can be provided to enable the exemplary free-space pointing device to learn IR codes from other remote controls. Rotational sensors 712 provide readings to processor 700 regarding, e.g., the y-axis and z-axis rotation of the free-space pointing device as described above. Accelerometer 714 provides readings to processor 700 regarding the linear acceleration of the free-space pointing device 400 that can be used as described above, e.g., to perform tilt compensation and to compensate for errors which linear acceleration introduces into the rotational readings generated by rotational sensors 712. Transceiver 716 communicates information to and from free-space pointing device 400, e.g., to a controller in a device such as an entertainment system or to a processor associated with the computer 110. The transceiver 716 can be a wireless transceiver, e.g., operating in accordance with the BLUETOOTH standards for short-range wireless communication or an IR transceiver. Alternatively, free-space pointing device 400 can communicate with systems via a wire-line connection.

Stationary detection function 608 can operate to determine whether the free-space pointing device 400 is, for example, either stationary or active (moving). This categorization can be performed in a number of different ways. One way is to compute the variance of the sampled input data of all inputs (x, y, z, αy, αz) over a predetermined window, e.g., every quarter of a second αy and αz are rotational data from the sensors 502, 504, respectively. This variance is then compared with a threshold to classify the free-space pointing device as either stationary or active.

By analyzing inputs from the pointing device 400 in the frequency domain, e.g., by performing a Fast Fourier Transform (FFT) and using peak detection, the processor 700 can also determine whether the free-space pointing device 400 is either stationary or active and detect the small movements of the free-space pointing device 400 introduced by a user's hand tremor. Tremor can be identified as peaks in the range of human tremor frequencies, e.g., nominally 8-12 Hz.

Although the variances in the frequency domain can be sensed within a particular frequency range, the actual frequency range to be monitored and used to characterize the status of the free-space pointing device 400 may vary. For example, the nominal tremor frequency range may shift based on, e.g., the ergonomics and weight of the free-space pointing device 200, e.g., from 8-12 Hz to 4-7 Hz.

As mentioned above, tremor data may be memorized as typically each user will exhibit a different tremor pattern. This property of user tremor can also be used to identify users. For example, a user's tremor pattern can be memorized by the system (either stored in the free-space pointing device 400 or transmitted to the system) during an initialization procedure wherein the user is requested to hold the free-space pointing device as steadily as possible for a period, e.g., 10 seconds. This pattern can be used as the user's unique signature to perform a variety of user interface functions.

For example, the user interface can identify the user from a group of users by comparing a current tremor pattern with patterns stored in memory. The identification can then be used, for example, to retrieve preference settings associated with the identified user.

For example, if the free-space pointing device is used in conjunction with the media systems described in the above-incorporated by reference patent application, then the media selection item display preferences associated with that user can be activated after the system recognizes the user via tremor pattern comparison. System security can also be implemented using tremor recognition, e.g., access to the system may be forbidden or restricted based on the user identification performed after a user picks up the free-space pointing device 400.

Figure 8:
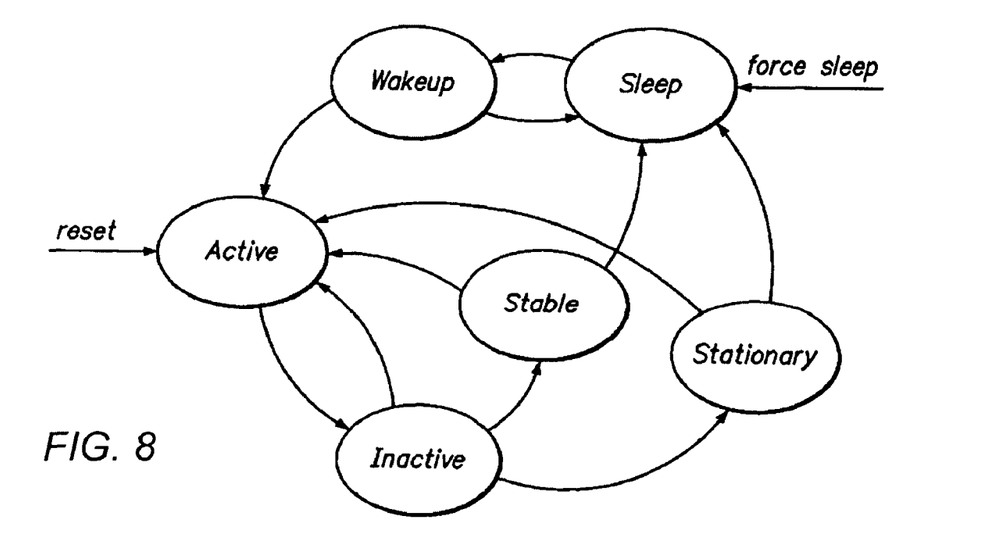
FIG. 8 is a state diagram depicting a stationary detection mechanism for a free-space pointing device.
Figure 9A:
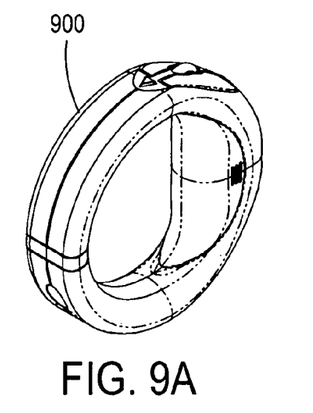
FIGS. 9A-9D illustrate an exemplary free-space pointing device.
Figure 9B:
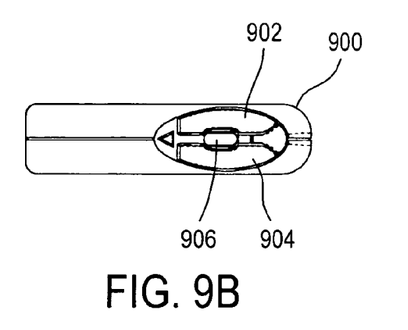
Figure 9C:
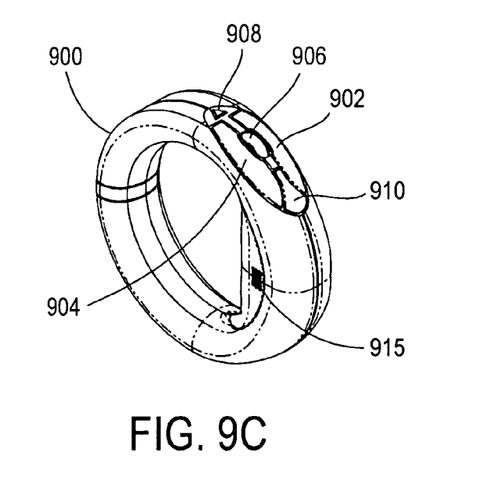
Figure 9D:
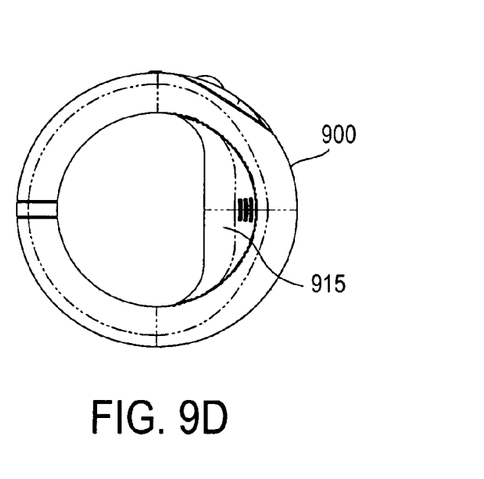

Stationary detection mechanism 608 can include a state machine, an example of which is depicted in FIG. 8. An ACTIVE state is, in the example, the default state during which the free-space pointing device 400 is being used to provide inputs to a user interface for example. The free-space pointing device 400 can enter the ACTIVE state on power-up of the device as indicated by a reset input. If the free-space pointing device 400 stops moving, it may then enter an INACTIVE state. The various state transitions depicted in FIG. 8 can be triggered by any of a number of different criteria including, but not limited to, data output from one or both of the rotational sensors 502 and 504, data output from the accelerometer 506, time domain data, frequency domain data, or any combination thereof.

State transition conditions are generically referred to here using the convention "Condition$_{stateA\_stateB}$". For example, the free-space pointing device 400 will transition from the ACTIVE state to the INACTIVE state when condition$_{active\_inactive}$ occurs. For the sole purpose of illustration, consider that condition$_{active\_inactive}$ can, in an exemplary free-space pointing device 400, occur when mean and/or standard deviation values from both the rotational sensor(s) and the accelerometer fall below predetermined threshold values for a predetermined time period.

State transitions can be determined by a number of different conditions based upon the interpreted sensor outputs. Exemplary condition metrics include the variance of the interpreted signals over a time window, the threshold between a reference value and the interpreted signal over a time window, the threshold between a reference value and the filtered interpreted signal over a time window, and the threshold between a reference value and the interpreted signal from a start time. All, or any combination, of these condition metrics can be used to trigger state transitions. Alternatively, other metrics can also be used. A transition from the INACTIVE state to the ACTIVE state may occur either when (1) a mean value of sensor output(s) over a time window is greater than predetermined threshold(s) or (2) a variance of values of sensor output(s) over a time window is greater than predetermined threshold(s) or (3) an instantaneous delta between sensor values is greater than a predetermined threshold.

The INACTIVE state enables the stationary detection mechanism 608 to distinguish between brief pauses during which the free-space pointing device 400 is still being used, e.g., on the order of a tenth of a second, and an actual transition to either a stable or stationary condition. This protects against the functions which are performed during the STABLE and STATIONARY states, described below, from inadvertently being performed when the free-space pointing device is being used. The free-space pointing device 400 will transition back to the ACTIVE state when condition$_{inactive \rightarrow active}$ occurs, e.g., if the free-space pointing device 400 starts moving again such that the measured outputs from the rotational sensor(s) and the accelerometer exceeds the first threshold before a second predetermined time period in the INACTIVE state elapses.

The free-space pointing device 400 will transition to either the STABLE state or the STATIONARY state after the second predetermined time period elapses. As mentioned earlier, the STABLE state reflects the characterization of the free-space pointing device 400 as being held by a person but being substantially unmoving, while the STATIONARY state reflects a characterization of the free-space pointing device as not being held by a person. Thus, an exemplary state machine can provide for a transition to the STABLE state after a second predetermined time period has elapsed if minimal movement associated with hand tremor is present or, otherwise, transition to the STATIONARY state.

The STABLE and STATIONARY states define times during which the free-space pointing device 400 can perform various functions. For example, since the STABLE state is intended to reflect times when the user is holding the free-space pointing device 400 but is not moving it, the device can record the movement of the free-space pointing device 400 when it is in the STABLE state e.g., by storing outputs from the rotational sensor(s) and/or the accelerometer while in this state. These stored measurements can be used to determine a tremor pattern associated with a particular user or users as described below. Likewise, when in the STATIONARY state, the free-space pointing device 400 can take readings from the rotational sensors and/or the accelerometer for use in compensating for offset.

If the free-space pointing device 400 starts to move while in either the STABLE or STATIONARY state, this can trigger a return to the ACTIVE state. Otherwise, after measurements are taken, the device can transition to the SLEEP state. While in the SLEEP state, the device can enter a power-down mode wherein power consumption of the free-space pointing device is reduced and, e.g., the sampling rate of the rotational sensors and/or the accelerometer is also reduced. The SLEEP state can also be entered via an external command so that the user or another device can command the free-space pointing device 400 to enter the SLEEP state.

Upon receipt of another command, or if the free-space pointing device 400 begins to move, the device can transition from the SLEEP state to the WAKEUP state. Like the INACTIVE state, the WAKEUP state provides an opportunity for the device to confirm that a transition to the ACTIVE state is justified, e.g., that the free-space pointing device 400 was not inadvertently jostled.

The conditions for state transitions may be symmetrical or may differ. Thus, the threshold associated with the condition$_{active \rightarrow inactive}$ may be the same as (or different from) the threshold(s) associated with the condition$_{inactive \rightarrow active}$. This enables free-space pointing devices to capture more accurately user input. For example, exemplary embodiments which include a state machine implementation allow, among other things, for the threshold for transition into a stationary condition to be different from the threshold for the transition out of a stationary condition.

Entering or leaving a state can be used to trigger other device functions as well. For example, the user interface can be powered up based a transition from any state to the ACTIVE state. Conversely, the free-space pointing device and/or the user interface can be turned off (or enter a sleep mode) when the free-space pointing device transitions from ACTIVE or STABLE to STATIONARY or INACTIVE. Alternatively, the cursor 410 can be displayed or removed from the screen based on the transition from or to the stationary state of the free-space pointing device 400.

The STABLE state can be used to memorize tremor data. Typically, each user will exhibit a different tremor pattern. This property of user tremor can also be used to identify users. For example, a user's tremor pattern can be memorized by the system (either stored in the free-space pointing device 400 or transmitted to the system) during an initialization procedure in which the user is requested to hold the free-space pointing device as steadily as possible for, e.g., 10 seconds.

This pattern can be used as the user's unique signature to perform a variety of user interface functions. For example, the user interface can identify the user from a group of user's by comparing a current tremor pattern with those stored in memory. The identification can then be used, for example, to retrieve preference settings associated with the identified user. For example, if the free-space pointing device is used in conjunction with a media system, then the media selection item display preferences associated with that user can be activated after the system recognizes the user via tremor pattern comparison. System security can also be implemented using tremor recognition, e.g., access to the system may be forbidden or restricted based on the user identification performed after a user picks up the free-space pointing device 400.

According to one exemplary embodiment of the present invention, operation of a handheld device may be as follows. The handheld device 100 communicates both device movement (delta x, delta y, delta z) and orientation to the computer 110, e.g., over a wireless data link such as Bluetooth. In addition, other actions performed by the user are communicated, e.g., button presses and gesture recognition. Computer 110 then makes that information available to the application software 120 for processing.

As described above, an exemplary handheld device (or free-space pointing device) 100 may resemble a mouse such as mouse 400 illustrated in FIGS. 4 and 5. Button presses on mouse 400 correspond to actuation of buttons 402 and 404 and scroll wheel 406 for example. A button may correspond to a particular function or action within a gaming application for example.

Another exemplary free-space pointing device 100 may resemble a loop-shaped device such as that illustrated in FIGS. 9A-9D and designed by HillCrest Labs of Rockville, Md. Free-space pointing device 900 includes buttons 902 and 904 and scroll wheel 906 (corresponding to buttons 402 and 404 and scroll wheel 406 of FIG. 4).

In addition, pointing device 900 may include programmable buttons 908 and 910. Each of these buttons may be programmed to perform a particular function or action within a gaming application for example. Free-space pointing device 900 may also include a grip 915 which may facilitate a better hold of the device to a user or game participant. In some embodiments or for use in particular gaming applications, grip 915 may include a plurality of sensors associated with a particular functionality for example.

The application software 120 takes the input data (from device 100 via computer 110) and processes it according to the game scenario of interest. In the most basic of implementations, the handheld device 100 emulates a gun or similar weapon and the bullet, grenade, ray blast or similar projectile is fired when the user hits the button. In one exemplary, but purely illustrative, embodiment, the handheld device 100 could be modeling a gun. The game application 120, and potentially the movement characteristics, could change depending on what type of gun the device 100 was being used to model. Even the number of firings could be changed depending on the type of weapon. The direction the gun fires in the game corresponds to the direction that the handheld device 100 is pointed.

For more complex interactions, the movement characteristics of the handheld device 100 may change depending on what type of device it is currently emulating. For example, if the handheld device 100 is meant to be a shoulder-mount weapon, the movement processing equations are altered to simulate inertia by requiring more significant handheld device movement to result in any on-screen motion. By way of comparison, if the handheld device 100 is emulating a handgun, then a different set of movement processing equations are applied to the data, such that less significant handheld device movements result in on-screen adjustment of the direction of fire of the weapon.

Furthermore, the usage of the weapon in the gaming application 120 can be altered based on movement of the handheld device 100. For example, in order to reload the weapon in the game, a specific weapons reloading gesture of the handheld device 100 can be recognized, e.g., a rapid back and forth movement of the handheld device that simulates the pump action on a shotgun. More specifically, a gesture command could be defined to involve a forward motion of the handheld device followed within a predetermined time period by a backward motion of the handheld which gesture could be associated with a pump action. The forward and backward motions could further be specified to involve a predetermined magnitude change in one or more of position, velocity and acceleration of the handheld device 100.

Unlike conventional systems, some of which only recognize point and click operations, the provision of handheld devices and user interfaces according to the present invention enable the full 6-degrees of motion data and button press activity of the handheld device 100 to interact with the game application 120 to produce a full immersion experience. The game alters to fit the emulated device and those changes are made in both the handheld motion response equations and in the visualization.

Thus, exemplary embodiments of the present invention couple the application 120 and the movements and actions of the device 100 together in unique combinations. The result is an experience that goes beyond individual device and software performance and instead achieves a holistic performance that rivals immersion gaming. Weapon size, capacity, reloading and activation can all be emulated by fully exploiting the measurement of motion and button activations of the handheld device. The software can adjust how that motion activity is interpreted to fully convey the size. This then leads to a semantic gaming implementation. The generic device 100 is semantically transformed into the desired operational device by the application.

According to other exemplary embodiments of the present invention, special purpose devices 100 could be designed that emphasize certain performance traits over others. These devices would still be able to convey 2 or 6 degree of freedom information to the computer 110 and/or application 120, but would also be configured to provide special information, or simply ergonomic tailoring. One item in particular that could be adjusted is grip.

Additionally, or alternatively, a recoil feature could be added. For example, pulling a trigger could release a spring-loaded mass within the gun, causing the mass to strike against a stop. Between shots, a gear drive, worm, or similar machine would recompress the spring and reset the latch. The actual movements of the handheld device 100 associated with the recoil could be measured and transmitted back to the application 120 such that the visual display of the gun on the screen showed the movements of the emulated gun caused by the recoil. In this way, users that were better able to handle the recoil or adapt to the recoil, would see their weapons operate more effectively in the gaming application.

While exemplary embodiments describe a user interacting with or facing a user interface (displaying a gaming application for example) on a single display (such as display 408 of FIG. 4), the user interface may be extended to cover multiple displays. For example, four such displays may be positioned on each of the four sides surrounding a user or game participant. Similarly, three such displays may be used—one on each of two sides of the user and one in front of the user. Alternatively, multiple displays may be positioned above each other in a vertical orientation. Multiple displays can also be positioned next to each other in a horizontal orientation. The use of multiple displays requires an operating system that supports multiple screens.

A user's manipulation or motion of the device 100 (in a particular pre-defined manner for example) may result in a pointer movement from a first display to a second display for example. Once the pointer has been moved or navigated from a first display to a second display, the user may re-orient his or her position so that the user now faces the second display.

Similarly, while exemplary embodiments describe the use of a single handheld device, multiple handheld devices can also be used. In such scenario, a sub channel may be used to communicate data from the second handheld device. This may be applicable in those gaming environments where two (or, more) players may be involved for example.

The embodiments described above may facilitate adapting a user input device 100 to perform functionality associated with a steering wheel, a squash racket or a fishing rod/reel in a gaming environment for example.

Figure 10:
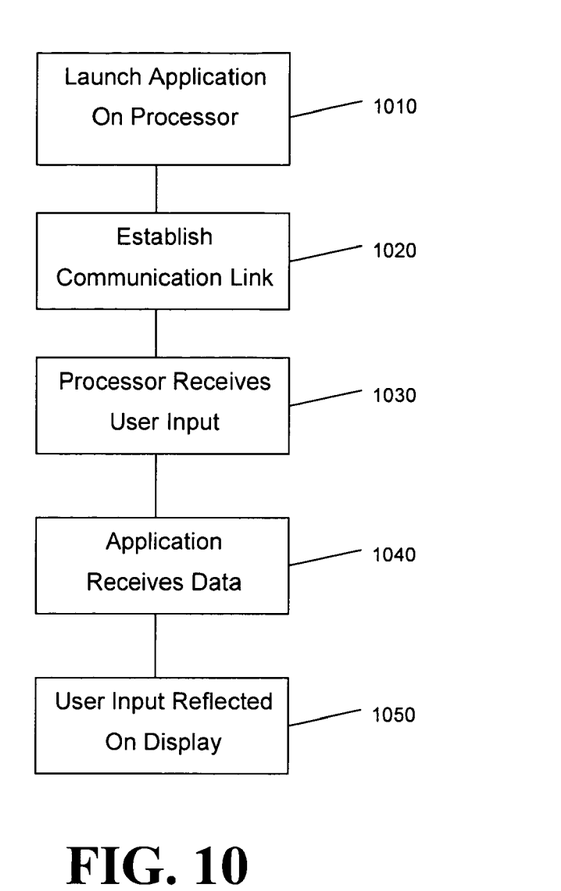
FIG. 10 illustrates a method in accordance with exemplary embodiments.

A method in accordance with exemplary embodiments may be more clearly understood with respect to FIG. 10. The method 1000 includes executing an application program 120 on processor 110 at 1010. A communication data link may be established between the handheld user input device 100 and the processor 110 at 1020. User input may be received at 1030 by processor 110 from handheld user input device 100. Data may be received by application program 120 from processor 110 at 1040. User input corresponding to one of motion and orientation of handheld user input device 100 may be reflected on a display at 1050.

The above-described exemplary embodiments are intended to be illustrative in all respects, rather than restrictive, of the present invention. Thus the present invention is capable of many variations in detailed implementation that can be derived from the description contained herein by a person skilled in the art. For example, while the description focused on a gaming environment, exemplary embodiments may be equally applicable in a training or visual acuity for physical therapy.

All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A gaming system comprising:
    a handheld user input device including an accelerometer for detecting a linear acceleration of said handheld user device and at least one other sensor for detecting a rotational motion of said handheld user input device;
    a processor for receiving as input data, linear acceleration data corresponding to said linear acceleration and rotational motion data corresponding to said rotational motion, from said handheld user input device; and
    a gaming application for receiving compensated data from said processor based on said input data received from the handheld user input device,
    wherein
    said handheld user input device emulates one of a plurality of different devices based on said gaming application, and
    said processor applying different sets of movement processing equations for said plurality of different devices such that a set of movement processing equations for said one of a plurality of different devices is applied based on an inertia of said one of a plurality of different devices.

2. The gaming system of claim 1, wherein said handheld user input device is a free-space pointing device.

3. The gaming system of claim 1, wherein said command is a gesture of said handheld device.

4. The gaming system of claim 3, wherein said one of said different devices is a gun.

5. The gaming system of claim 3, wherein said one of said different devices is a steering wheel.

6. The gaming system of claim 1, further comprising:
    a display for reflecting said motion and orientation of the handheld device.

7. The gaming system of claim 6, wherein said display comprises a plurality of displays being positioned surrounding a user.

8. The gaming system of claim 7, wherein a particular motion associated with the handheld device results in moving a corresponding cursor from one display to a second display.

9. The gaming system of claim 1, wherein said input data from said handheld user input device is communicated to the processor over a wireless data link.

10. The gaming system of claim 9, wherein the wireless link is a Bluetooth link.

11. The gaming system of claim 9, wherein the wireless link is an IR link.

12. The gaming system of claim 1, further comprising a second handheld user input device.

13. The gaming system of claim 12, wherein the second handheld user input device communicates with the processor over a second wireless link.

14. The gaming system of claim 5, wherein said gesture is a lateral motion of said handheld device to emulate a steering action.

15. The gaming system of claim 1, wherein said processor is further configured to compensate said detected motion of said handheld user input device by transforming said detected motion from the body frame of reference associated with said handheld user input device into an inertial frame of reference.

16. The gaming system of claim 1, wherein said at least one other sensor is a camera.

17. The gaming system of claim 1, wherein said at least one other sensor is an optical sensor.

18. The gaming system of claim 1, wherein said accelerometer is a multi-axis accelerometer and wherein said at least one second output includes a value y generated by said multi-axis accelerometer associated with acceleration of said handheld device user input in a y-axis direction and a value z generated by said multi-axis accelerometer associated with acceleration of said handheld user input device in a z-axis direction.

19. The gaming system of claim 18, wherein said multi-axis accelerometer is a 3-axis accelerometer.

20. The gaming system of claim 1, wherein said input data is generated at a sampling rate of 200 samples/second.

21. A method for using a handheld user input device, said method comprising:
    executing an application program on a processor;
    establishing a communication data link between the handheld user input device and the processor;
    generating raw data by an accelerometer and at least one other sensor based on a motion of the handheld user input device, wherein said handheld user input device emulates one of a plurality of different devices based on said application program, the raw data describes the motion of the handheld user input device and the raw data includes linear acceleration data and rotational motion data generated by the accelerometer and the at least one other sensor;
    receiving the raw data from said handheld user input device including the linear acceleration data from the accelerometer and the rotational motion data from the at least one other sensor, said linear acceleration data and said rotational motion data being associated with a linear acceleration and a rotational motion of said handheld user input device;
    processing the raw data from the accelerometer and the at least one other sensor to produce compensated data;
    receiving the compensated data by the application program based on the received linear acceleration data and the rotational motion data; and
    applying different sets of movement processing equations for said plurality of different devices such that a set of movement processing equations for said one of a plurality of different devices is applied based on an inertia of said one of a plurality of different devices.

22. The method of claim 21, wherein the application program is a gaming application.

23. The method of claim 21, wherein the user input data is received by the processor over a wireless data link.

24. The method of claim 21, wherein the handheld user input device is a free-space pointing device.

25. The method of claim 21, wherein said sensor is a camera.

26. The method of claim 21, wherein said at least one other sensor is an optical sensor.

27. The method of claim 21, wherein said accelerometer is a multi-axis accelerometer and wherein said at least one second output includes a value y generated by said multi-axis accelerometer associated with acceleration of said handheld device in a y-axis direction and a value z generated by said multi-axis accelerometer associated with acceleration of said handheld device in a z-axis direction.

28. The method of claim 27, wherein said multi-axis accelerometer is a 3-axis accelerometer.

29. The method of claim 21, wherein said user input data is generated at a sampling rate of 200 samples/second.

30. The method of claim 21, wherein said processing of said raw data for orientation of said handheld user input device further comprises:

compensating detected motion of said handheld user input device by transforming said detected motion from a body frame of reference associated with said handheld user input device into an inertial frame of reference.

* * * * *